(No Model.)
P. A. DOWD.
ELECTRIC LAMP FOR BICYCLES.
No. 598,198.  Patented Feb. 1, 1898.
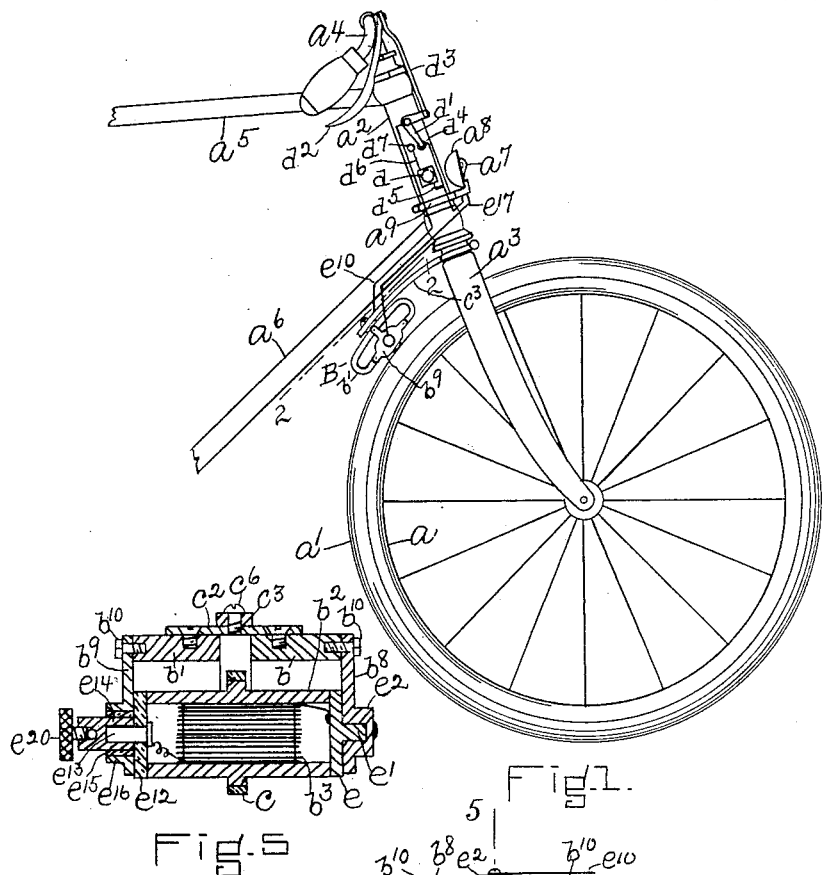
WITNESSES.
Matthew M. Blunt
J. Murphy
INVENTOR
Peter A. Dowd
by Jas. H. Churchill
ATT'Y
THE NORRIS PETERS CO., PHOTO-LITHO., WASHINGTON, D. C.

UNITED STATES PATENT OFFICE.

PETER A. DOWD, OF BOSTON, MASSACHUSETTS, ASSIGNOR TO THE DOWD ELECTRIC COMPANY, OF SAME PLACE.

ELECTRIC LAMP FOR BICYCLES.

SPECIFICATION forming part of Letters Patent No. 598,198, dated February 1, 1898.

Application filed July 10, 1897. Serial No. 644,038. (No model.)

*To all whom it may concern:*

Be it known that I, PETER A. DOWD, residing in Boston, in the county of Suffolk and State of Massachusetts, have invented an Improvement in Electrically-Illuminated Lamps for Bicycles, of which the following description, in connection with the accompanying drawings, is a specification, like letters on the drawings representing like parts.

This invention relates to an electrically-illuminated lamp especially designed and adapted, among other uses, to be employed on bicycles and like vehicles.

My present invention has for its object to provide a simple, inexpensive, and efficient electric light for the purpose specified.

In accordance with this invention an incandescent electric lamp is supplied with current from a substantially small electric machine of the magneto form having its armature provided at substantially its longitudinal center with a friction-wheel which makes contact with one of the wheels of the bicycle. These and other features of this invention will be pointed out in the claims at the end of this specification.

Figure 1 is a side elevation of a sufficient portion of a bicycle provided with an electrically-illuminated lamp embodying my invention to enable it to be understood; Fig. 2, a detail, on an enlarged scale, of the magneto-electric machine shown in Fig. 1, looking down from the line 2 2; Fig. 3, an under side view of the magneto shown in Fig. 2; Fig. 4, a detail in section on the line 4 4, Fig. 3, to be referred to; and Fig. 5, a sectional detail to be referred to.

In the present instance I have chosen to illustrate my invention in connection with a bicycle which may be of any suitable or usual construction and of which I have shown in Fig. 1 the front wheel $a$, provided with the pneumatic or other tire $a'$, and the front portion of the frame, consisting of the head-piece $a^2$, the forks $a^3$, the handle-bar $a^4$, and the tubes or bars $a^5$ $a^6$.

In accordance with this invention the bicycle is equipped with an electric light consisting, as shown, of an incandescent lamp $a^7$ and a reflector $a^8$, which is attached by a bracket $a^9$ to the head-piece $a^2$, but which lamp in practice may be attached to any other desired part of the bicycle.

The lamp $a^7$ is supplied with current from a substantially small electric machine B, which may be of any suitable or desired construction and which in the present instance is represented as of the magneto type, comprising permanent magnets $b$ $b'$ for its field-magnets, and an armature $b^2$, provided with a winding or coil $b^3$, having its ends connected to suitable terminals, as will be described. The armature $b^2$ is journaled in supports $b^8$ $b^9$, which may be plates of brass fastened, as by screws $b^{10}$, to the opposite sides of the field-magnets.

In accordance with this invention the armature $b^2$ has suitably secured to it a friction ring, disk, or wheel $c$, which is frictionally rotated and in the present instance makes contact with the tire $a'$ of the wheel $a$. The friction-wheel $c$, as herein shown, is fastened to the armature substantially near its center and between the field-magnets $b$ $b'$, which are connected together, as herein shown, by a tie-bar $c^2$, to which is adjustably fastened one end of a supporting-bar $c^3$, suitably fastened at its other end to the head-piece $a^2$ of the bicycle-frame.

The supporting-bar $c^3$ is shown as provided with a slot $c^5$, through which a screw $c^6$ extends into the tie-bar $c^2$.

In Fig. 5 I have represented one construction and method of electrically connecting the armature-coil with the circuit-wires of the lamp, and by reference to Fig. 5 it will be seen that the armature is provided at one end with a disk $e$, of metal, having a stud $e'$, extended into a hub $e^2$ on the supporting-piece $b^8$, to which the wire $e^{10}$ is connected.

The armature $b^2$ has fastened to its opposite end a disk $e^{12}$, of rubber or other insulating material, carrying a metal pin or stud $e^{13}$, to which the other end of the armature-coil is connected and which forms the opposite journal for the armature and runs in a metal sleeve $e^{14}$, upon which is fitted a sleeve $e^{15}$, of insulating material, which has fitted upon it the hub $e^{16}$ of the supporting-frame or side piece $b^9$. The circuit-wire $e^{17}$ is connected to the sleeve $e^{14}$ and, as shown, is inserted into a hole in the head or solid end of the said sleeve and fastened by a set-screw $e^{20}$.

By reference to Fig. 1 it will be seen that the bicycle-wheel $a$ when revolving frictionally drives the wheel $c$, and by reason of the small size of the wheel $c$ the latter makes many revolutions to one revolution of the wheel $a$, and consequently the alternations of the current passing through the lamp $a^7$ are so rapid as to have the effect of a continuous current, and thereby produce a steady light.

The electric lamp is shown as attached to the head-piece $a^2$; but it is evident it may be attached to any other stationary part of the wheel.

I have shown my invention as applied to a bicycle; but it may be applied equally well to automobile and other vehicles and in other places where it is convenient and economical for frictionally driving the armature of an electric machine. So, also, the magneto may be attached to the bicycle so as to be driven by the rear wheel as well as by the front. The current generated by the magneto may also be utilized for ringing a vibrating bell $d$, and the circuit of the bell may and preferably will be controlled by a switch $d'$, which may be operated, as shown, by the brake-lever $d^2$, to which the switch-lever $d'$ may be joined by a link or rod $d^3$. As shown in Fig. 1, the switch $d$ has connected to it one circuit-wire $e^{10}$, the other wire, $e^{17}$, after passing through the lamp, being connected to a terminal $d^4$. The magnet of the bell $d$ has one end, $d^5$, of its coil connected to the wire $e^{17}$ and the other end, $d^6$, connected to a terminal $d^7$.

I have herein shown and described a magneto-electric machine for generating the current; but it is evident that a substantially small dynamo-electric machine may also be used for the same purpose.

By reference to Fig. 2 it will be seen that the friction-wheel $c$ is attached to the armature near its longitudinal center, and as a result the friction created at the bearings for the armature is equalized, and the armature is thereby enabled to be more easily rotated than if the friction-wheel were mounted at one end of the armature. Furthermore, this location of the friction-wheel renders the generator herein shown sightly, as the generator may be located behind and substantially in line with the tire of the bicycle-wheel and does not project materially beyond the sides of the wheel. So, also, this location of the friction-wheel renders the generator neat, compact, and efficient.

I claim—

1. The combination with a bicycle, of an electric translating device carried thereby, and a current-generator for said translating device having its armature journaled in non-magnetic pieces attached to the sides of the field-magnets, a frictional wheel attached to said armature substantially at its longitudinal center, and a support for said field-magnets attached to the bicycle-frame and to which said field-magnets are adjustably secured to enable the said friction-wheel to engage the periphery of a wheel of the said bicycle, substantially as described.

2. The combination with a wheeled vehicle, of an electric lamp carried thereby, and a current-generator for said lamp comprising permanent magnets $b\ b'$ attached to the frame of the vehicle, and an armature having bearings in side pieces attached to the said magnets and provided with a friction disk or wheel at or near its longitudinal center and between said field-magnets to make contact with the periphery of a wheel of said vehicle, substantially as described.

3. The combination with a bicycle, of an electric lamp carried thereby, and a current-generator for said lamp comprising permanent field-magnets $b\ b'$ attached to the bicycle-frame, side pieces of non-magnetic material attached to said field-magnets, an armature journaled in said side pieces, and a friction disk or wheel secured to the said armature intermediate of said field-magnets to engage the periphery of the bicycle-wheel and equalize the friction on the armature-journals, substantially as described.

In testimony whereof I have signed my name to this specification in the presence of two subscribing witnesses.

PETER A. DOWD.

Witnesses:
JAS. H. CHURCHILL,
J. MURPHY.